Jan. 16, 1923.
D. E. ROSS
HYDRAULIC STEERING GEAR.
FILED MAY 24, 1922.
1,442,540
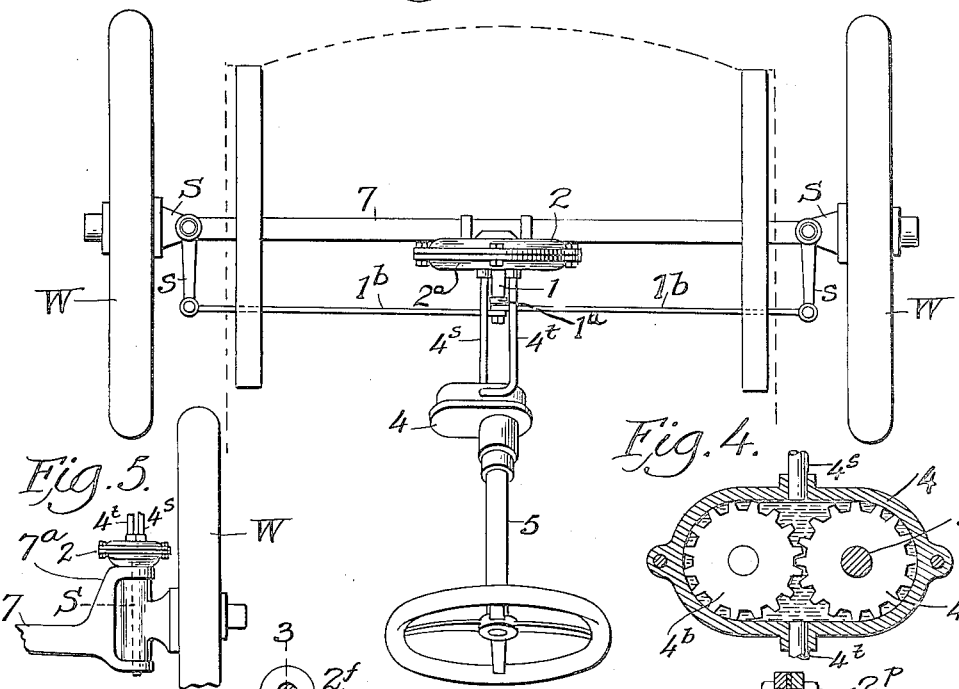
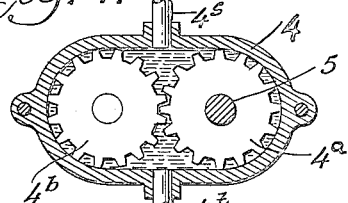
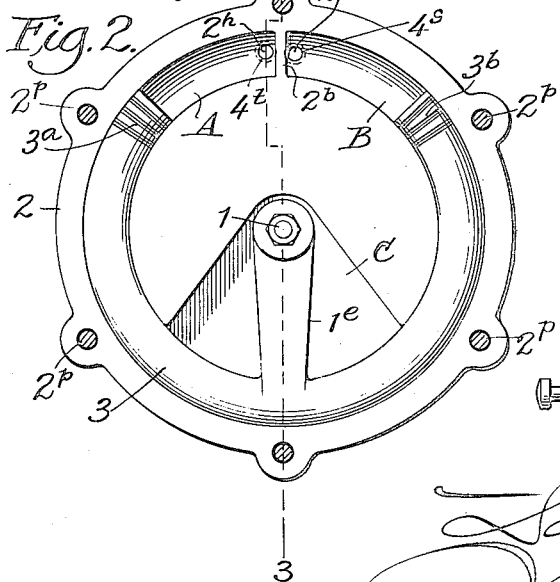
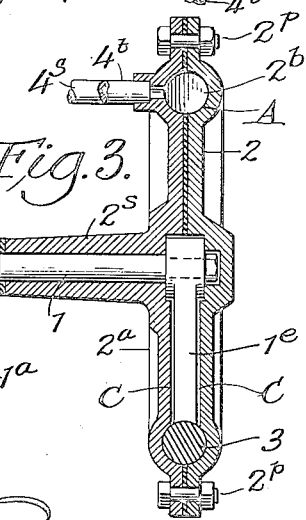
INVENTOR.
David E. Ross
BY
Alexander Powell
ATTORNEYS Patented Jan. 16, 1923.

1,442,540

UNITED STATES PATENT OFFICE.

DAVID E. ROSS, OF LA FAYETTE, INDIANA, ASSIGNOR TO ROSS GEAR & TOOL COMPANY, OF LA FAYETTE, INDIANA, A CORPORATION OF INDIANA.

HYDRAULIC STEERING GEAR.

Application filed May 24, 1922. Serial No. 563,421.

*To all whom it may concern:*

Be it known that I, DAVID E. Ross, a citizen of the United States, residing at La Fayette, in the county of Tippecanoe and State of Indiana, have invented certain new and useful Improvements in Hydraulic Steering Gears; and I hereby declare that the following is a full, clear, and exact description thereof, reference being had to the accompanying drawings, which form part of this specification.

This invention is a novel improvement in steering gears for automobiles and the like, in which the usual steering shaft is preferably operatively connected to a fluid pump by which fluid can be forced into a hydraulic actuating apparatus operatively connected with the steering wheels; so that the manual turning of the steering shaft right or left will cause the desired shifting of the steering wheels.

The object of the invention is to provide an improved apparatus by which motion is transmitted from the steering wheel to the steering axle through a fluid actuated intermediary, the parts being so constructed that power will be transmitted positively and quickly from the steering head to the axle; and there will be such amplification of power that the steering wheels may be readily shifted and securely held with no more exertion on the part of the operator than is ordinarily required to operate mechanical steering gears.

To enable others skilled in the art to adopt and use the invention I will explain the same with reference to the accompanying drawings which illustrate one embodiment thereof; and summarize in the claims the essentials of the invention and novel features of construction and novel combinations of parts for all of which protection is desired.

In said drawings:

Fig. 1 is a conventional plan view of the complete steering apparatus as applied to the steering wheels of an automobile.

Fig. 2 is a view of the rocker shaft actuating devices with one side of the enclosing casing removed.

Fig. 3 is a section on the line 3—3, Fig. 2.

Fig. 4 is a conventional sectional view of a rotary gear pump.

Fig. 5 is a view illustrating the steering head as applied directly to a steering wheel spindle-support.

The invention resides principally in the novel apparatus for imparting rocking motion by hydraulic pressure to a rock shaft, or other member, to be oscillated. In Fig. 1 of the drawings the rocking member is shown as the rocker shaft 1 of an automobile steering gear, said rock shaft having a steering arm or crank $1^a$ on one end which may be connected by the usual links $1^b$ to the usual cranks S on the steering wheel spindle-supports S.

As shown rock shaft 1 is journaled in a cylindric extension $2^s$ of a supporting casing, preferably formed of two opposed complemental members 2 and $2^a$; and one side of member 2 from the bearing member $2^p$ projects axially outward as shown. The members 2 and $2^a$ are formed or provided in their opposed faces with annular channels, concentric with the axis of the shaft 1 and part $2^s$; which channels together form, when the parts are assembled, an annular cylinder which is divided into two working chambers by a partition $2^b$, which may be formed integral with the parts 2, $2^a$ or separately therefrom. The parts 2 and $2^a$ are preferably divided in the central plane of the cylinder so that the cylinder and chambers A, B, C, can be readily formed in the meeting faces of the members 2, $2^a$, and these members may be securely fastened together in any desired manner. As shown they are provided with peripheral flanges united by bolts $2^p$.

Fitted within the annular cylinder opposite the partition is a curved piston 3 which is concentric with shaft 1 and is adapted to move endwise in the cylinder around the axis of shaft 1. Piston 3 extends about 280° within the annular cylinder, and its ends $3^a$ and $3^b$ lie at opposite sides of the partition $2^b$, and should be suitably packed to form fluid tight joints between the ends of the piston and the walls of the cylinder. The spaces in the cylinder between the opposite sides of partition $2^b$ and opposite ends $3^a$, $3^b$ of the piston 3 form working chambers A and B into which operating fluid, preferably liquid, may be admitted through suitable ports $2^h$, $2^f$, adjacent partition $2^b$, as hereinafter explained. The piston 3, being concentric with shaft 1, when it is shifted, by the admission of fluid into one chamber A (or B), will be moved endwise and force fluid out of the other chamber B (or A).

The piston 3 is fixedly connected to a crank arm 1$^e$ on the end of the rocker shaft 1 and within the casing; said casing being provided with a segmental chamber C (formed by suitable opposed recesses in the members 2, 2$^a$) which permits the arm 1$^e$ to swing right or left according to the movement of the piston 3.

As shown the fluid is admitted to or from the chamber A through a port 2$^h$ formed in the casing adjacent the partition 2$^b$; and fluid is admitted to or from the chamber B through a port 2$^f$ formed in the casing adjacent the partition. The actuating fluid may be supplied from any suitable source preferably by a pump 4, one port of the pump 4 being shown as connected by a pipe 4$^s$ to port 2$^f$, and the port 2$^h$ being connected by a pipe 4$^t$ with the other port of the pump 4.

The fluid pump 4 may be of any suitable construction. As shown it comprises a casing in which are fitted two rotary intermeshing pump gears 4$^a$ and 4$^b$ which together practically fill the casing and prevent communication between the pipes 4$^s$ and 4$^t$ except around the gears, as in fluid gear pumps. The fluid can be admitted to the pump through pipe 4$^t$ and expelled through pipe 4$^s$, or vice versa. The gears should be so fitted in the casing that practically no oil or fluid can leak between the gears, and all the fluid containing parts and their connections should be such that no oil or fluid can leak therefrom even when under great pressure.

Preferably a steering shaft 5 is connected to gear 4$^a$ of the pump, so that the pump can be operated directly and manually by the steering shaft. As the opposite ports of the pump are directly in communication with the opposite chambers A and B it will be seen that if the steering gear be turned clockwise fluid will be expelled through the pipe 4$^t$ into chamber A, and simultaneously drawn into the pump from chamber B; and vice versa; such action of the fluid will compel the piston 3 to move around in the annular cylinder and rock the shaft 1.

The parts should be so proportioned that the amount of fluid necessary to be displaced in order to move the piston 3 a certain distance, would require a predetermined extent of rotary movement of the steering shaft and pump gears; and by properly proportioning the size and teeth of the said gears and the diameter of the bore of the cylinder, and chambers A and B relative to the extreme length of stroke which may be imparted to the arm 1$^a$, it will be possible to so augment the power transmitted from the wheel to the piston through the fluid medium, that the arm 1$^a$, to which the steering wheels are connected, will be moved and held with the necessary power and positiveness to enable the vehicle to be controlled safely and easily from the steering wheel. The drawings do not illustrate the relative proportions of parts but those skilled in the art can readily determine the arrangement and proportions necessary to obtain the desired augmentation of power, or reduction of speed, between the steering wheel and the rocker shaft.

The pump casing, the pipes, port and cylinder should be kept constantly filled with heavy fluid so that any movement imparted to the pump gears will be immediately correspondingly transmitted, with the proper augmentation of power to the piston 3. The pump chambers may be kept full of oil and any possible leakage compensated for by any suitable means.

The casing may be supported on the chassis in any suitable manner, being conventionally illustrated in Fig. 1 as supported upon the front axle 7 of the chassis.

As shown in Fig. 5 the casing 2 could be mounted on the bifurcated end 7$^a$ of the axle 7 above the steering wheel spindle-support S and the shaft 1 be directly connected to the said spindle-support, to which the front wheel W is attached. This would do away with the arm 1$^a$ and steering connections between said arm and the wheels. In such case I would preferably connect such a device to one of the steering wheel spindle-supports and connect both supports together by means of a single rod 1$^b$, and cranks S.

I claim:

1. A hydraulic steering gear having adjacent working chambers end to end curved on arcs concentric with the rocker shaft; a rocker shaft; piston members in the working chambers connected with the rock shaft and moving in arcs concentric thereto; and means for admitting fluid into one chamber and simultaneously exhausting it from the other, whereby the rocker shaft is rocked; with a fluid pump; a steering shaft for actuating the pump and connections between opposite ports of the pump and the respective working chambers, substantially as described.

2. In a hydraulic steering gear, the combination of a casing having adjacent working chambers arranged end to end and curved on arcs concentric with a rocker shaft; a rocker shaft mounted in the casing; piston members in the working chambers connected with the rock shaft and moving in arcs concentric thereto, and means for admitting fluid into one chamber and simultaneously exhausting it from another, a fluid pump, a steering shaft for actuating the pump, and connections between opposite ports of the pump and the respective working chambers, substantially as described.

3. In apparatus of the character specified a casing having an annular cylinder, a partition therein dividing it into opposite working chambers, a parti-annular piston in said cylinder having its opposite ends entering the opposite working chambers, a rocker shaft mounted in the casing having its axis concentric with the curvature of the cylinder, a connection between said rocker shaft and the piston, and means for admitting fluid to or from the working chambers so as to cause the piston to turn endwise in the cylinder, and thereby rock the shaft.

4. In a hydraulic steering gear as set forth in claim 3 a fluid pump, a steering shaft for actuating the pump and connections between opposite ports of the pump and the respective working chambers, substantially as described.

5. In a hydraulic steering gear, a casing composed of opposite members having recesses in their opposed faces forming opposite working chambers curved on an arc concentirc with the axis of a rocker shaft; a rocker shaft with annular piston members confined in the opposite working chambers, an arm attached to the rocker shaft, and connected with the piston members; said casing members being provided with recesses to permit the oscillation of said arm; and means for admitting fluid to or from said working chambers.

6. In a hydraulic steering gear as set forth in claim 5 a fluid pump, a steering shaft and wheel for actuating the fluid pump, and connections between opposite ports of the pump and the ports of the said working chambers, substantially as described.

7. In hydraulic steering gear, a casing composed of opposite members having recesses in their opposed faces forming an annular cylinder, a rocker shaft journaled in said casing having its axis concentric with the annular cylinder; a transverse partition in said cylinder dividing it into opposite working chambers; a parti-annular piston in said cylinder having its ends projecting into the opposite working chambers, an arm attached to the rocker shaft within the casing, and connected with the piston, said members being provided with recesses to permit the oscillation of said arm; and means for admitting fluid to or from said working chambers.

8. In a hydraulic steering gear as set forth in claim 7, a fluid pump, a steering shaft for actuating the pump and connections between opposite ports of the pump and the respective working chambers, substantially as described.

9. In hydraulic steering gear, a casing composed of opposite members having recesses in their opposed faces forming an annular cylinder, a partition in said cylinder dividing it into opposite working chambers, a rocker shaft journaled in said casing having its axis concentric with the annular cylinder, a parti-annular piston in said cylinder having its ends projecting into opposite working chambers, an arm attached to a rock shaft within the casing and fixedly connected with the piston, said members being provided with recesses in their opposed faces forming a chamber to permit the oscillation of said arm; and means for admitting fluid to or from said working chambers.

10. In combination with a hydraulic steering gear as set forth in claim 2 a fluid pump, a steering shaft and wheel for actuating the fluid pump, and connections between opposite ports of the pump and the respective ports of said working chambers, substantially as described.

11. In a hydraulic steering gear as set forth in claim 2, said casing being pivotally fixed to an axle adjacent the steering wheel spindle-support, and said rocker shaft being connected to the steering wheel spindle-support.

12. In a hydraulic steering gear as set forth in claim 3, said casing being pivotally fixed to an axle adjacent the steering wheel spindle support and said rocker shaft being connected to the steering wheel spindle-support.

In testimony that I claim the foregoing as my own, I affix my signature.

DAVID E. ROSS.